Figure 1:
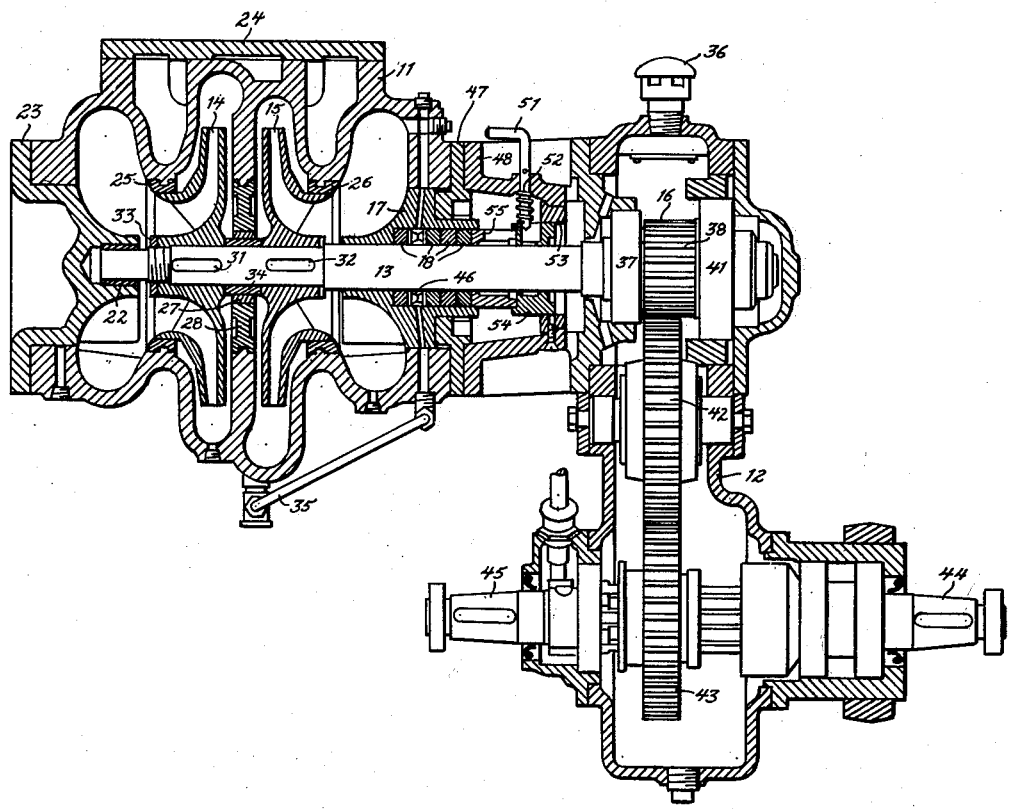

Dec. 1, 1964     H. A. EBERHARDT III     3,159,559

PUMP APPARATUS

Filed May 13, 1960

INVENTOR.
HARRY ALFRED EBERHARDT, III

BY *John D. Myers*

ATTORNEY.

United States Patent Office 3,159,559
Patented Dec. 1, 1964

3,159,559
PUMP APPARATUS
Harry Alfred Eberhardt III, 636 School Line Drive, King of Prussia, Pa.
Filed May 13, 1960, Ser. No. 29,095
5 Claims. (Cl. 204—197)

This invention relates to improvements in pump apparatus, and more particularly concerns a pump or the like having a shaft, and a packing arrangement which includes a means for preventing harmful corrosion of said shaft.

When apparatus made up of a housing (which is under pressure or vacuum) and a shaft moving in relation to the housing is exposed to intermittent service, there is usually a severe corrosion problem on the surface of the shaft. For instance, in centrifugal fire pumps the shaft is one of the few parts that occasionally require replacement. These shafts must be replaced because they become pitted and grooved under the packing and no longer effect a proper seal. A fire pump is used only occasionally, the rest of the time it may be drained. However, moisture is usually retained for some time in the packing. The presence of this moisture and the oxygen in the surrounding air is highly conducive to pitting corrosion. In operation, the pitted surface wears the packing very rapidly, resulting in the excessive leakage. The operator may tighten up the packing, and in doing so, tighten it too much, and as a result, groove the shaft. This cycle of leakage, followed by tightening too much, may then be repeated causing rapid deterioration of both the packing and the shaft. The fire pump industry has had to contend with this situation for many years.

This type of pitting has not been limited to the fire pump industry. For instance, in steering gears for ships, pitting of the ram (which turns the rudder) under the packing, while the apparatus is in storage, is such a severe problem that it is common practice to leave out the packing until the mechanism is installed in the vessel.

Accordingly, it is an object of this invention to minimize leakage around a shaft.

It is another object to prevent pitting of a pump shaft or the like.

Further objects are to provide a better distribution of packing pressure, and to facilitate repacking.

It is another object to accomplish all of this in a practical and economical manner.

Figure 2:
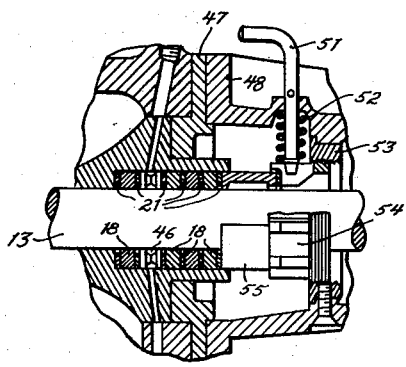

Other objects and advantages of this invention, including its simplicity and economy, as well as the ease with which it may be adapted to existing equipment, will further become apparent hereinafter and in the drawing, in which:

FIG. 1 is a vertical section through a two-stage centrifugal fire pump constructed in accordance with this invention; and FIG. 2 is a view on an enlarged scale of the stuffing box which is shown in FIG. 1.

Although specific terms are used in the following description for clarity, these terms are intended to refer only to the structure shown in the drawing and are not intended to define or limit the scope of the invention.

I have discovered that pitting of a shaft inside a stuffing box is caused by galvanic action between the shaft material and the packing or stuffing box material. I have solved this problem in a commercially practical way by substituting a more active galvanic couple in the form of sacrificial corrosion-preventing rings.

The substitute galvanic couple includes corrosion-preventing rings in intimate contact with the elements of the packing arrangement.

Turning now to the specific embodiment of the invention selected for illustration in the drawing, there is shown centrifugal fire pump apparatus comprising a pump body or housing 11, a drive-unit housing 12, a pump shaft 13 positioned in housings 11, 12 and extending therebetween, impellers 14, 15 mounted on pump shaft 13 within pump housing 11, a drive unit 16 mounted in drive-unit housing 12 and operatively connected to pump shaft 13 to rotate pump shaft 13 and impellers 14, 15, a stuffing-box housing 17 positioned around pump shaft 13 between housings 11 and 12, a plurality of packing rings 18 positioned in stuffing-box housing 17 around pump shaft 13, and means including corrosion-protection rings 21 interposed between packing rings 18 to inhibit galvanic action between pump shaft 13 and packing rings 18.

Pump housing 11 includes front bearing 22, front bearing housing 23, pump housing cover plate 24, impeller clearance rings 25, 26, center bearing 27, and center bearing housing 28.

Impeller keys 31, 32 protrude from pump shaft 13 which has associated therewith an impeller lock nut 33, and an impeller spacer 34. Extending from pump housing 11 to stuffing-box housing 17 is a packing-cooling inlet tube 35.

Drive-unit housing 12 has positioned therein: inside rear bearing 37, pump shaft gear 38, outside rear bearing 41, intermediate gear 42, and sliding gear 43. A vent 36 extends from drive-unit housing 12.

Mounted in housing 12 is tail shaft 44, which is in alignment with sliding gear 43, and extends rearwardly to be connected to a drive shaft (not shown). Sliding gear shaft 45 is mounted in housing 12 in alignment with sliding gear shaft 45 and extends forwardly thereof.

Besides stuffing-box housing 17, the stuffing box includes (FIG. 2) a lantern ring 46 for admitting fluid from the pressure side of the pump to the stuffing box to prevent air leakage and to provide cooling and lubrication, a packing-housing flange 47, a rear-bearing housing 48, a packing-gland lock pin 51, a packing-gland lock pin spring 52, a packing-gland adjustment sleeve 53, a packing nut 54, and a split, pump-shaft packing gland 55 which is moved axially along the shaft 13 as required to exert pressure on packing rings 18.

In operation, impellers 14, 15 are rotated by drive unit 16 and the stuffing box forms a non-corrosive seal on the pump shaft 13 between these elements.

Corroison-protection rings 21 are interposed between (and preferably at the ends of the series of) packing rings 18 and operate to inhibit galvanic action between shaft 13 and packing rings 18; corrosion protection rings 21 also inhibit galvanic action between shaft 13 and stuffing-box housing 17, lantern ring 46, and the packing gland 55 in the immediate vicinity of the packing.

In addition, these rings 21 act as dams to cut down on leakage from packing ring to packing ring. By preventing the soft packing rings 18 from forming a homogeneous mass, rings 21 help distribute the mechanical pressure generated by packing gland 55 to the more distant packing rings. The rings 21 also facilitate the removal of the packing rings should it become necessary to repack the pump.

To act as a corrosion protecting agent, the rings 21 are made from a material which is more anodic (or less noble) than the material in shaft 13. Corrosion-protection rings 21 are in abutting contact with the adjacent packing rings 18, stuffing-box housing 17, lantern packing ring 46, and packing gland 55, so that the current path between them is extremely short. The location and material of the corrosion-protection rings 21 generate a preferred galvanic couple between rings 21 and the more noble members in the immediate vicinity, i.e., elements 13, 17, 18, 46, and 55. Since corrosion-protection rings 21 are the most anodic members of the galvanic couple, all of the deterioration occurs on these sacrificial members.

Excellent results have been obtained in apparatus wherein shaft 13 is made of 400 series stainless steel, packing rings 18 contain an abundance of graphite (extremely cathodic or noble), and stuffing-box housing 17, lantern ring 46, and packing gland 55 are made of bronze and the corrosion-protection rings 21 are made of zinc. However, it is not the intent of this disclosure that the invention be limited to any of these materials. For instance, magnesium, aluminum, or cadmium could be substituted for the zinc in rings 21.

It has been found that fire pumps and shaft assemblies constructed in accordance with the present invention have eliminated excessive leakage from the stuffing-box, and have eliminated pitting of the pump shaft beneath the stuffing box.

The term "corrosion-resisting" (as used herein to describe rings 21) does not mean that all corrosion is eliminated in the apparatus. Instead, it means that the destructive corrosion of the shaft assembly which results in leakage is eliminated. This is accomplished by transferring the corrosion to the long-lasting sacrificial rings 21, the corrosion of which does not cause leakage.

As used herein, the term "graphite packing rings" is not to be construed as referring to rings made of graphite only, since the packing rings may be formed of other suitable materials or compositions, but I preferably employ packing rings of the conventional woven or braided type having graphite particles interspersed therein.

It is to be understood that the form of the invention herewith shown and described in to be taken as a preferred embodiment. Various changes may be made in the shape, size and arrangement of parts. For example, equivalent elements may be substituted for those illustrated and described, parts may be reversed, and certain features of the invention may be utilized independently of the use of other features, all without departing from the spirit or scope of the invention as defined in the subjoined claims.

The claimed invention:

1. Pump apparatus comprising a pump housing, a drive-unit housing, a pump shaft positioned in said housings and extending therebetween, an impeller mounted on said pump shaft within said pump housing, a drive unit housing and operatively connected to said pump shaft to rotate it and said impeller, a stuffing-box housing positioned around said pump shaft between said pump and drive-unit housings, a plurality of packing rings positioned in said stuffing-box housing around and in conductive contact with said pump shaft, said packing rings being made of a material more cathodic than the material of which said shaft is made, packing gland means positioned around the shaft and operative upon said packing rings for exerting pressure against them to form a seal with said shaft, and a plurality of corrosion-protection rings abutting and in conductive contact with said packing rings, centered by said stuffing-box housing, and spaced away from said shaft, said corrosion-protection rings being made of a material more anodic than the material of which said shaft is made, whereby said corrosion-protection rings create a galvanic couple with said packing rings, inhibit destructive galvanic action between said shaft and said packing rings, and inhibit leakage of pumping liquid between said packing rings.

2. Pump apparatus comprising a pump housing, a drive-unit housing, a stainless steel pump shaft positioned in said housings and extending therebetween, an impeller mounted on said pump shaft within said pump housing, a drive unit mounted in said drive-unit housing and operatively connected to said pump shaft to rotate it and said impeller, a stuffing-box housing positioned around said pump shaft between said pump and drive-unit housings, a plurality of graphite packing rings positioned in said stuffing-box housing around and in conductive contact with said pump shaft, packing gland means positioned around said pump shaft and operative upon said packing rings for exerting pressure against them to form a seal with said pump shaft, and a plurality of zinc rings abutting and in conductive contact with said packing rings, centered by said stuffing-box housing and spaced away from said pump shaft to create a preferred galvanic couple between said graphite packing rings and said zinc rings, to inhibit galvanic action between said stainless steel pump shaft and said graphite packing rings, and to inhibit leakage of pumping liquid between said packing rings.

3. In a pump, a shaft, a stuffing-box housing positioned around the shaft, a plurality of packing rings positioned around and in conductive contact with the shaft in said stuffing-box housing, said packing rings being made of a material more cathodic than the material of which said shaft is made, packing gland means positioned around the shaft and operative upon said packing rings for exerting pressure against them to form a seal with said shaft, and a plurality of corrosion-protection rings abutting and in conductive contact with said packing rings, centered by said stuffing-box housing, and spaced away from said shaft, said corrosion-protection rings being made of a more anodic material than the material of which said shaft is made, whereby said corrosion-protection rings create a preferred galvanic couple with said packing rings, inhibit galvanic action between said shaft and said packing rings, and inhibit leakage of pumping liquid between said packing rings.

4. The apparatus defined in claim 3, wherein said shaft is made of 400 series stainless steel, said packing rings contain graphite, and said corrosion-protection rings are made of zinc.

5. Pump apparatus comprising a pump housing, a pump shaft positioned in said housing and extending therefrom, an impeller mounted on said pump shaft within said pump housing, a stuffing box positioned around said pump shaft, a plurality of packing rings positioned around and in conductive contact with said pump shaft in said stuffing box, said packing rings containing a material more cathodic than the material of which said shaft is made, packing gland means positioned around the shaft and operative upon said packing rings for exerting pressure against them to form a seal with said shaft, and a plurality of corrosion-protection rings abutting and in conductive contact with said packing rings, centered by said stuffing box, and spaced away from said shaft, said corrosion-protection rings being made of a material more anodic than the material of which said shaft is made, whereby said corrosion-protection rings create a galvanic couple with said packing rings, and inhibit galvanic action between said shaft and said packing rings.

References Cited in the file of this patent

UNITED STATES PATENTS

| | | |
|---|---|---|
| 72,309 | Matthew | Dec. 17, 1867 |
| 1,900,011 | Durham | Mar. 7, 1933 |
| 2,020,844 | Magos | Nov. 12, 1935 |
| 2,067,839 | Godfrey | Jan. 12, 1937 |
| 2,343,440 | Andrus | Mar. 7, 1944 |
| 2,433,156 | Pezzillo | Dec. 23, 1947 |
| 2,673,103 | Tremolada | Mar. 23, 1954 |
| 2,967,486 | Spence | Jan. 10, 1956 |
| 2,858,768 | Gaylord et al. | Nov. 4, 1958 |
| 2,993,449 | Harland | July 25, 1961 |

FOREIGN PATENTS

| | | |
|---|---|---|
| 199,250 | Great Britain | June 21, 1923 |

OTHER REFERENCES

Serial No. 383,003 (A.P.C.), published May 18, 1943.

UNITED STATES PATENT OFFICE
CERTIFICATE OF CORRECTION

Patent No. 3,159,559            December 1, 1964

Harry Alfred Eberhardt III

It is hereby certified that error appears in the above numbered patent requiring correction and that the said Letters Patent should read as corrected below.

Column 1, line 26, strike out "the"; column 2, line 43, for "Corroison-protection" read -- Corrosion-protection --; column 3, line 41, after "unit" insert -- mounted in said drive-unit --; column 4, line 63, for "Jan. 10, 1956" read -- Jan. 10, 1961 --.

Signed and sealed this 13th day of April 1965.

(SEAL)
Attest:

ERNEST W. SWIDER            EDWARD J. BRENNER
Attesting Officer            Commissioner of Patents